United States Patent
Chauhan

(10) Patent No.: US 6,215,795 B1
(45) Date of Patent: Apr. 10, 2001

(54) PACKET SPACING OF MULTIPLE PACKET STREAMS

(75) Inventor: Abhishek Chauhan, Palo Alto, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 08/883,186

(22) Filed: Jun. 25, 1997

(51) Int. Cl.[7] ............................. H04J 3/22; H04J 3/24; H04J 3/02

(52) U.S. Cl. .................. 370/473; 370/468; 370/537; 370/538

(58) Field of Search ..................... 370/535, 538, 370/540, 468, 537, 229, 230, 235, 458, 465, 536

(56) References Cited

U.S. PATENT DOCUMENTS

| | | | |
|---|---|---|---|
| 2,564,419 | * 8/1951 | Bown | 370/540 |
| 3,700,820 | * 10/1972 | Blasbalg et al. | 370/540 |
| 4,833,671 | * 5/1989 | Beckner et al. | 370/537 |
| 4,891,805 | * 1/1990 | Fallin | 370/538 |
| 5,227,876 | * 7/1993 | Cucchi et al. | 370/535 |
| 5,544,324 | * 8/1996 | Edem et al. | 370/538 |

* cited by examiner

*Primary Examiner*—Ajit Patel
*Assistant Examiner*—Hanh Nguyen
(74) *Attorney, Agent, or Firm*—Skjerven Morrill MacPherson LLP

(57) ABSTRACT

Packets from multiple packet streams are transmitted in an output stream having substantially equally spaced packets using a scheduler which spaces the packets based upon the input stream speeds of the various input streams as well as the bandwidth of the transmission channel. Such a scheduler advantageously spaces the packets so that the maximum distance between two filled slots is never more than twice the minimum distance between any two filled slots. Such a system also advantageously allows the computation of the slot locations to be precomputed when the slots are initially allocated to streams, thereby allowing the scheduler to efficiently compute slot locations while the scheduler is receiving the input streams.

10 Claims, 7 Drawing Sheets

PACKET SPACING OF MULTIPLE PACKET STREAMS

BACKGROUND OF THE INVENTION

1. Field of the Invention

The present invention relates to packet streams, and more particularly, to spacing of multiple packet streams to provide a single output stream.

2. Description of the Related Art

It is known to provide a transmitter which receives multiple input streams of information and provides a single output stream of information. Often times the input streams and the output stream are divided into packets where each packet includes a certain number of bits of the bit stream. The packets are transmitted in slots, where a slot represents an opportunity to transmit data in the output stream. For example, a server, such as a video server, may serve multiple, simultaneous, constant bit-rate packet streams. Such a server may transmit several video clips simultaneously. In such a server, it is desirable that the packets of each individual stream be spaced equally apart. For example, FIG. 1 shows an example of distributing 1024 slots across a 1 second cycle time. In this example, a packet of information is transmitted every 0.976 msec Equally spacing the packets of information is challenging when multiple streams of information are being simultaneously transmitted. For example, if first stream (e.g., stream A) were transmitting 10 packets per second, the packets would desirably be spaced 100 msec apart (i.e., a packet spacing of 100 msec.). If another stream (e.g., Stream B) were transmitting 20 packets per second, the packets would desirably be spaced 50 msec apart. However, the combination of stream A and stream B transmit 30 packets per second; evenly spacing these packets would require that the packets be spaced 33 msec apart.

It is known to provide the transmitter with a packet scheduler that is responsible for transmitting all of these streams. The scheduler sits in a loop, and sleeps for some time (e.g., 33 msec in the above example) after which the scheduler wakes up. When the scheduler wakes up, it determines whether to transmit a packet from stream A or stream B. This determination is challenging as in general, there may be several streams from which the scheduler must choose when determining from which stream to transmit a packet. In this situation it is very difficult to determine from which stream to transmit a packet while maintaining the packets equally spaced from other transmitted packets.

SUMMARY OF THE INVENTION

It has be discovered that packets from multiple packet streams may been transmitted in an output stream having substantially equally spaced packets using a scheduler which spaces the packets based upon the input stream speeds of the various input streams as well as the bandwidth of the transmission channel. Such a scheduler advantageously spaces the packets so that the maximum distance between two successive filled slots is never more than twice the minimum distance between any two successive filled slots. Such a system also advantageously allows the computation of the slot locations to be precomputed when the slots are initially allocated to streams, thereby allowing the scheduler to efficiently compute slot locations while the scheduler is receiving the input streams.

It has also been discovered that such a system may be modified to take into account an accuracy parameter so that the system does not sleep until every packet within a particular cycle is transmitted (so that the system does not sleep after every slot), thereby advantageously increasing the efficiency of the scheduler.

It has also been discovered that the scheduler may be designed to increase the cycle time across which the slots are distributed. For example, in a system that has 4096 slots per second, rather than distributing slots across one second, the cycle time could be increased to allow slots to be distributed across a cycle time of 16 seconds. In this example, rather than having to distribute slots across 4096 slots in one second, the scheduler would distribute the slots across 65536 slots.

More specifically, in a preferred embodiment, the invention relates to a method for transmitting a plurality of input streams as a single output stream having an output stream bandwidth, each input stream having a corresponding input stream speed. The method includes the steps of determining a number of packets required to transmit an input stream of the plurality of input streams based upon the output stream bandwidth and the input stream speed of the input stream; repeating the determining step for each of the plurality of input streams; and evenly spacing the packets of each of the plurality of input streams in the single output stream based upon the number of packets required to transmit all of the plurality of input streams.

In another embodiment, the invention relates to a system for transmitting a plurality of input streams as a single output stream having an output stream bandwidth. Each input stream has a corresponding input stream speed. The system includes means for determining a number of packets required to transmit an input stream of the plurality of input streams based upon the output stream bandwidth and the input stream speed of the input stream; means for repeating the determining step for each of the plurality of input streams; and means for evenly spacing the packets of each of the plurality of input streams in the single output stream based upon the number of packets required to transmit all of the plurality of input streams.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
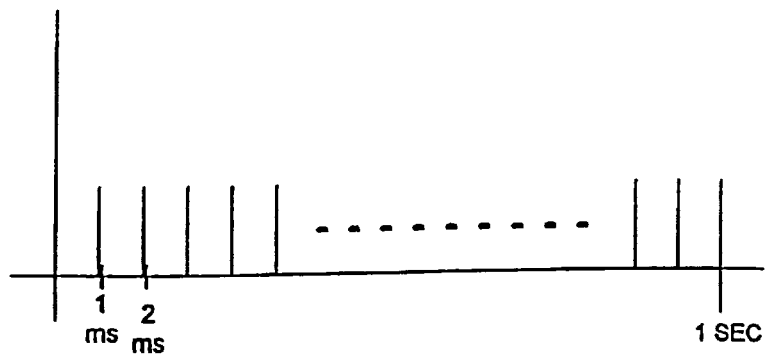
FIG. 1, labeled prior art, shows an example of evenly spacing packets of information.
Figure 2:
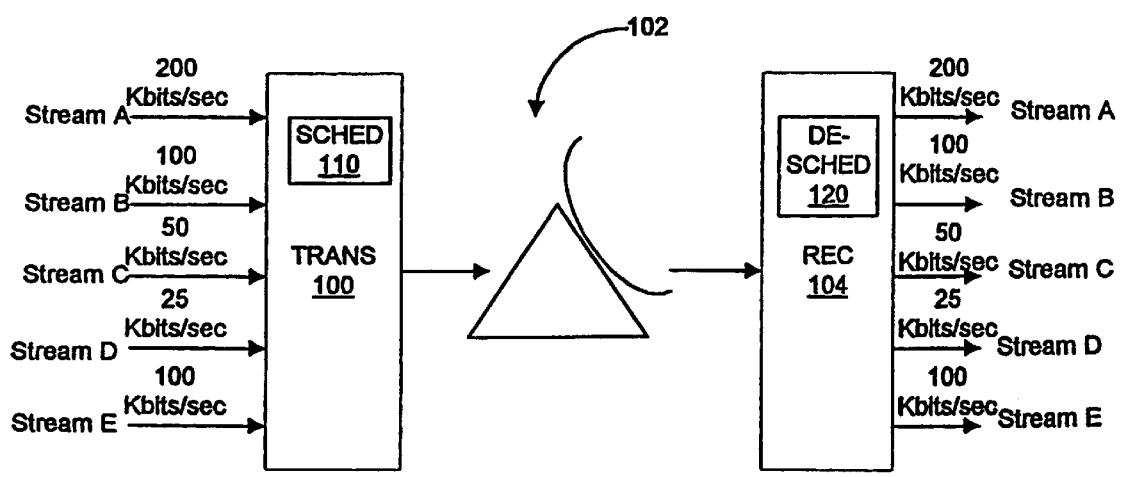
FIG. 2 shows a block diagram of a transmission system in accordance with the present invention.

Referring to FIG. 2, a transmission system includes a transmitter 100 which transmits a bit stream to, for example, a satellite 102. The satellite 102 then retransmits the bit stream to a receiver 104. Transmitter 100 receives a plurality of input bit streams, e.g., STREAM A, STREAM B, STREAM C, STREAM D and STREAM E. Each input bit stream may have a different input bandwidth. Transmitter 100 includes a scheduler 110 which receives these input bit streams and provides a single output bit stream in which the input bit stream information is provided in packets of information which are evenly spaced across the bandwidth of the output bit stream. Such a scheduler advantageously spaces the packets so that the maximum distance between two successive filled slots is never more than twice the minimum distance between any two successive filled slots.

Receiver 104 receives the retransmitted bit stream and divides the bit stream into a plurality of received output bit streams, e.g., STREAM A, STREAM B, STREAM C, STREAM D and STREAM E. Receiver 104 includes a descheduler 120 which receives the retransmitted bit stream and divides this bit stream into the appropriate received output bit stream.

Figure 3:
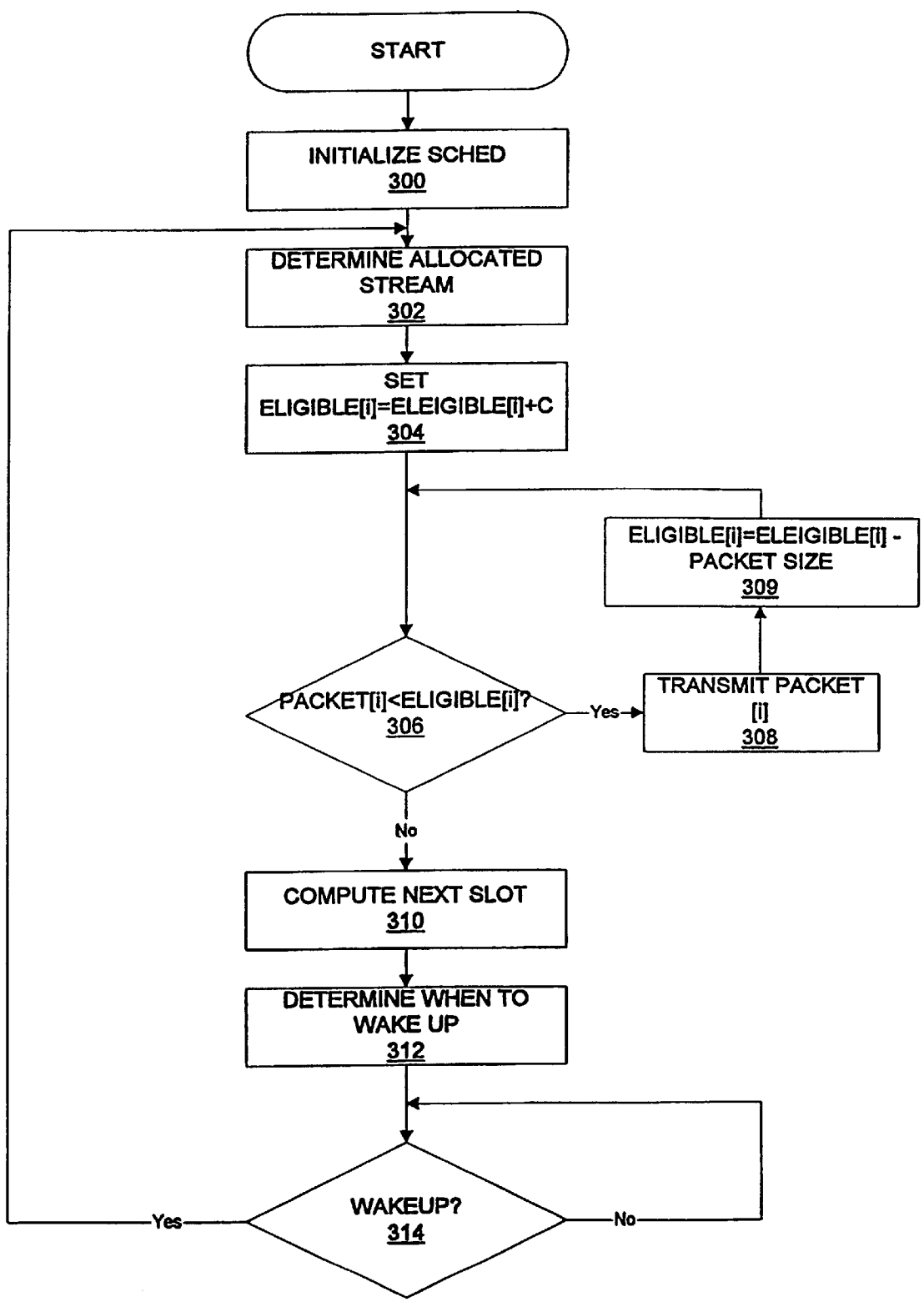
FIG. 3 shows a flow chart of the operation of the scheduler of the transmitter of the transmission system of FIG. 2.

Referring to FIG. 3, scheduler 110 allocates slots within the output bit stream evenly such that the packets are evenly spaced with respect to the individual stream as well as with respect to the overall output bit stream. The goal of scheduler 110 is that the total bytes transmitted for a stream versus time is a straight line with slope b[i]. While in practice, this is impossible as bytes are transmitted in impulses (i.e., slots) corresponding to packets in the input stream, the actual slope is desirably as close to a straight line as possible. An additional coal of scheduler 110 is that the total bytes transmitted on the output channel versus time should be a straight line with slope S.

In operation, at initializations step 300, scheduler 110 divides the total bandwidth (B) of transmitter 100 into small portions that are referred to as slots and determines the number of slots that each input stream requires.

More specifically, the total number of slots in a cycle (M) is chosen to be a power of two. The larger the number of slots, the finer the precision of the scheduler. However, the finer the precision the more processing power required to assign packets to slots. In a preferred embodiments, for a 10 Mbit output bandwidth, M equals 4096. Each slot has a bit transmission capacity (c), which represents the number of bytes that a slot may contain. The capacity of the slot is represented as follows:

$$c = \frac{B}{M}$$

Accordingly, in a preferred embodiment, the bit transmission capacity of a slot is 2441 bits.

Scheduler 110 allocates a subset of the slots M to each of the streams i. Each stream is assigned a number of slots as follows:

$$m[i] = \frac{b[i]}{c}$$

where, i=a slot number m[i]=the number of slots allocated to a stream i, and b[i]=the bandwidth requirement of a stream i.

After scheduler 110 is initialized, control transitions to allocate slot step 302. Each slot provides an opportunity to transmit c bits of data. Scheduler 110 cycles through the list of all available slots. For each slot (s), scheduler 110 determines what stream has been allocated a slot at allocate slot step 302. Control then transitions to eligible step 304 during which scheduler 110 determines the number of bits that stream i is eligible to transmit in the current slot where eligible[i]=eligible[i]+c Scheduler 110 then determines at size determination step 306 whether the size of a packet (i.e., the number of bits) of stream i waiting to be transmitted is less than the number of bits that are eligible to be transmitted. If the number of bits waiting to be transmitted is less than the number of bits that are eligible to be transmitted, then control transitions to transmit step 308 during which the contents of the slot are transmitted by transmitter 100. Control then transitions to decrement step 309 during which eligible[i]=eligible[i]-packet size.

Control then returns to determination step 306. Control loops until the number of bits waiting to be transmitted is greater than the number of bits eligible to be transmitted.

If the number of bits waiting to be transmitted is greater then the number of bits eligible to be transmitted, the control transitions to compute next slot step 310. During compute next slot step 310, scheduler 110 computes the next allocated slot from the set of slots and determines when the transmitter needs to wake up to fill this slot.

More specifically, the difference between the present slot and the next filled slot is first determined by subtracting the index of the next filled slot (next filled slot(s)) from the index of the present slot. I.e., diff=next filled slot(s)–s where:

next filled slot(s)=the index of the next filled slot; and s=index of the current slot.

Also the duration that the transmitter should be inactive (sd) is determined by dividing the difference by the number of slots within the output stream. I.e.

$$sd = \frac{diff}{M}$$

Control then transitions to make-up determination step 314. During make-up determination step 314, transmitter 100 determines whether it is time to become active based upon whether the sleep duration has been completed. After transmitter 100 wakes-up, control transitions to determine allocated stream step 302.

Figure 4:
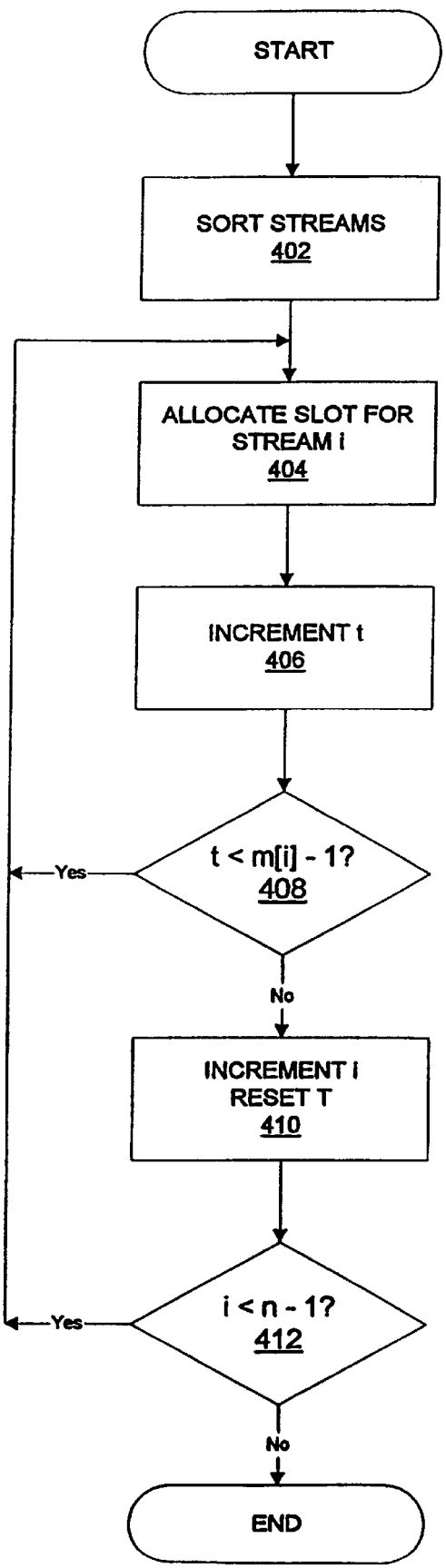
FIG. 4 shows a flow chart of the operation of the compute next slot step of the scheduler operation of FIG. 3.

Referring to FIG. 4, scheduler 110 evenly allocates slots taking into account the number of streams and the slot requirements for each stream. More specifically, scheduler 110 first sorts the streams in decreasing order of slot requirements during sort streams step 402. I.e., $$m[0] \geq m[1] \geq m[2] \geq \ldots \geq m[n-1]$$

where each stream has a requirement for a given number of slots based upon the bit stream rate of the stream and m[i] represents the number of slots that the stream requires.

Control then transitions to allocate slot step 404 during which scheduler 110 allocates a slot for the first slot of the first stream. Control then transitions to increment step 406 during which the slot number for the stream being processed is incremented. Control then transitions to determination step 408 during which the slot number is analyzed to determine whether the slot number is within the slot requirements for the stream being processed. If the slot number is within the slot requirements for the stream being processed then control transitions to allocate slot step 404 during which scheduler 110 allocates the next slot for the next slot number of the stream.

If the slot number is not within the slot requirements for the stream being processed, then control transitions to increment stream and reset slot number step 410 where the stream number is incremented and the slot number is reset so that the next stream may be processed. Control then transitions to determination step 412 during which the stream number is analyzed to determine whether the stream number is within the streams being processed. If the stream number is within the streams being processed, indicating that there are streams for which slots have not yet been assigned, then control transitions to allocate slot step 404.

If the stream number is not within the streams being processed, indicating that there slots have been assigned for all the information within all of the bit streams, then processing completes.

Figure 5:
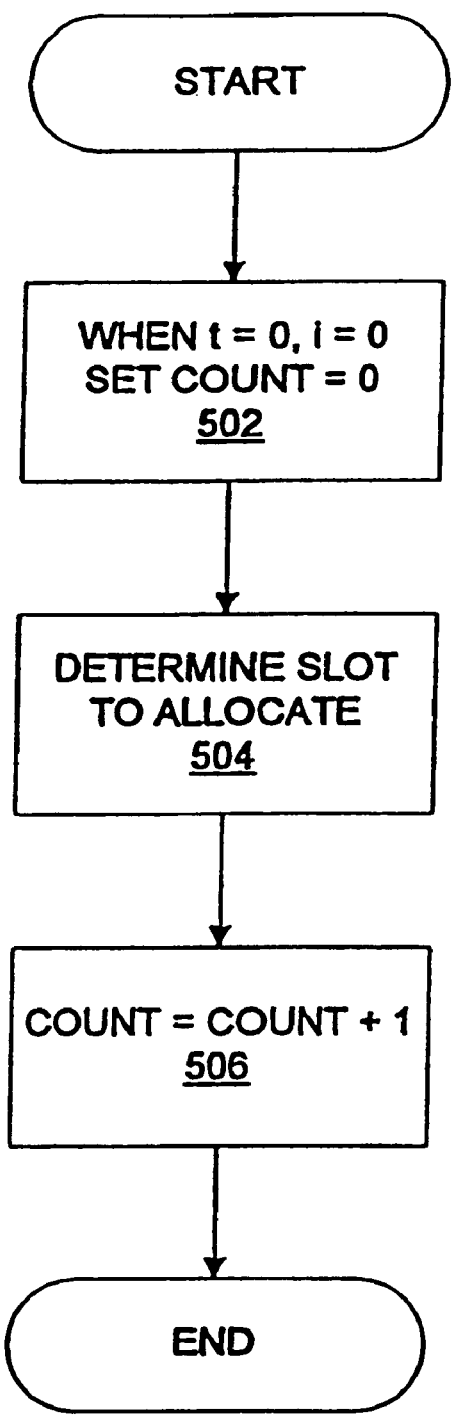
FIG. 5 shows a flow chart of the allocate slot function of the initialize operation of FIG. 4.

Referring to FIG. 5, allocate slot step 404 includes a number of operations when determining which slot to allocate within the output bit stream. Scheduler 110 analyzes the stream number and the slot number to determine whether the processing is the beginning of a new period. If the processing is the beginning of a new period, then the slot number count is set to zero during count step 502. Control then transitions to determine slot step 504 which determines the slot to allocate based upon the slot count. More specifically, the slot to allocate is related to the bit reverse of the binary value of the slot count. Control then transitions to increment count step 506 during which the slot count is incremented. Control then transitions to increment step 406 (see FIG. 4).

Figure 6:
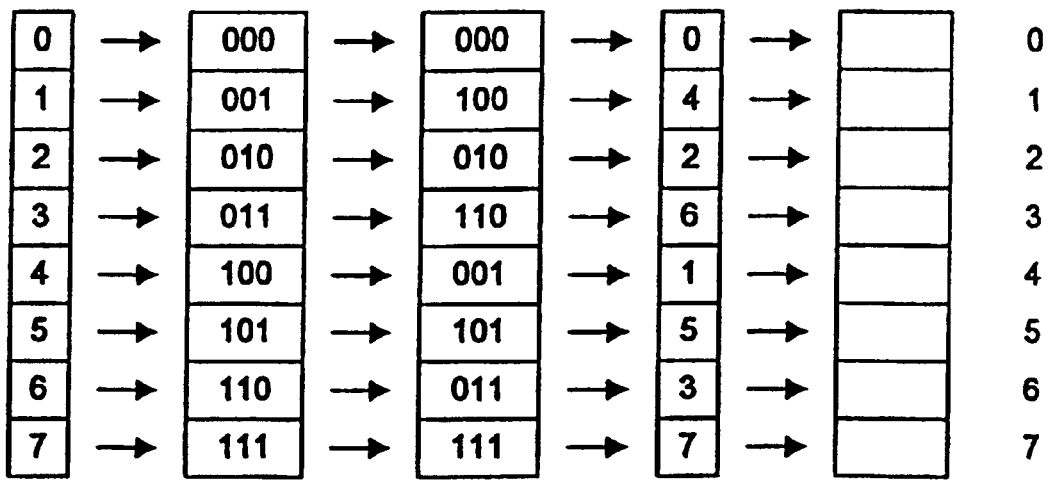
FIG. 6 shows an example of the slot determination function of the allocate slot function of FIG. 5.
Figure 7:
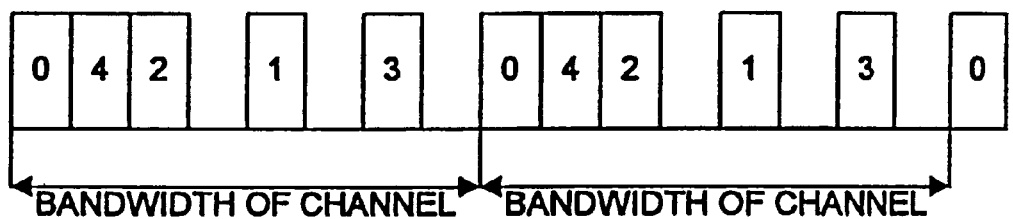
FIG. 7 shows an example of the order in which slots are allocated when performing the slot determination function of FIG. 6.

Referring to FIGS. 6 and 7, the determination of which slot to allocate is based upon the bit reverse of the binary value of the slot count. For example, if b[i] equals 8, then the binary count is a 3-bit binary number ranging from 000 to 111. The bit reverse values of this slot count are shown in FIG. 6. The bit reverse values determine the location within the output stream of a particular slot number. For example, as shown in FIG. 7, slot number 0 is transmitted in slot location zero of the output stream, slot number 1 is transmitted in slot location 4 of the output stream, slot number 2 is transmitted in slot location 3 of the output stream, etc . . . . This allocation is repeated every period of the channel.

Figure 8:
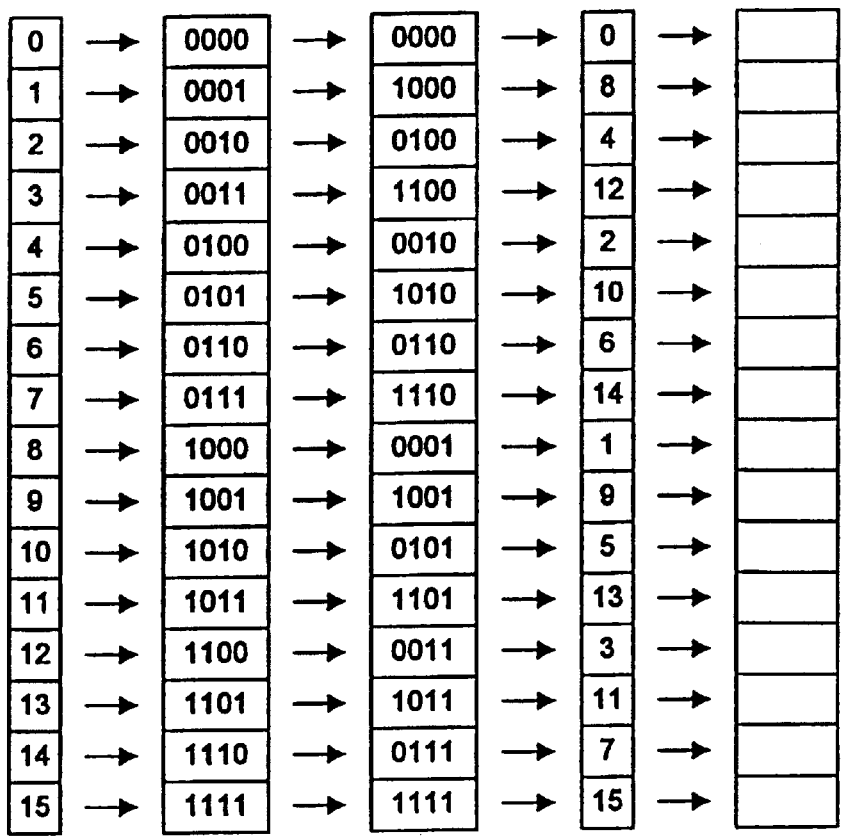
FIG. 8 shows an example of the slot determination function of the allocate slot function of FIG. 5.
Figure 9A:
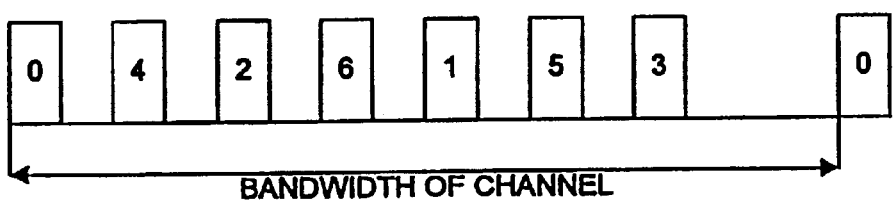
FIGS. 9A and 9B, generally referred to as FIG. 9, show examples of the order in which the slots are allocated when performing the slot determination function of FIG. 8.
Figure 9B:
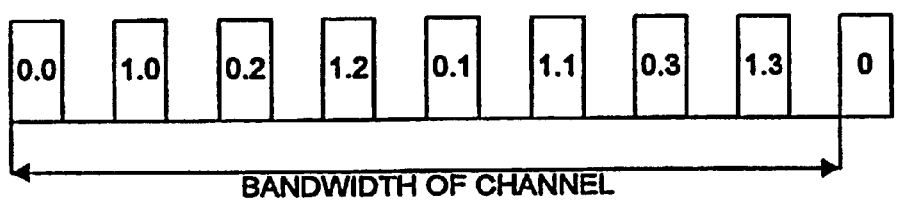

Referring to FIGS. 8 and 9, when b[i] equals 16, then the binary count is a 4-bit binary number ranging from 0000 to 1111. The bit reverse values of this slot count is shown in FIG. 8. The bit reverse values determine the location of a particular slot number within the output stream. For example, as shown in FIG. 9A, slot number 0 is transmitted in slot location zero, slot number 1 is transmitted in slot location 8, slot number 2 is transmitted in slot location 4, slot number 3 is transmitted in slot location 12, etc . . . . This allocation is repeated every period of the channel. Additionally, the bit reverse values in combination with the operation of scheduler 110 set forth in FIG. 4 controls the allocation of slots with multiple streams. For example, as shown in FIG. 9B, slot number 0 of stream number 0 is transmitted in slot location zero, slot number 1 of stream 0 is transmitted in slot location 8, slot number 2 of stream 0 is transmitted in slot location 4, slot number 3 of stream 0 is transmitted in slot location 12, slot number 0 of stream number 1 is transmitted in slot location 2, slot number 1 of stream 1 is transmitted in slot location 10, slot number 2 of stream 1 is transmitted in slot location 6, slot number 3 of stream 1 is transmitted in slot location 14, etc.

Figure 10:
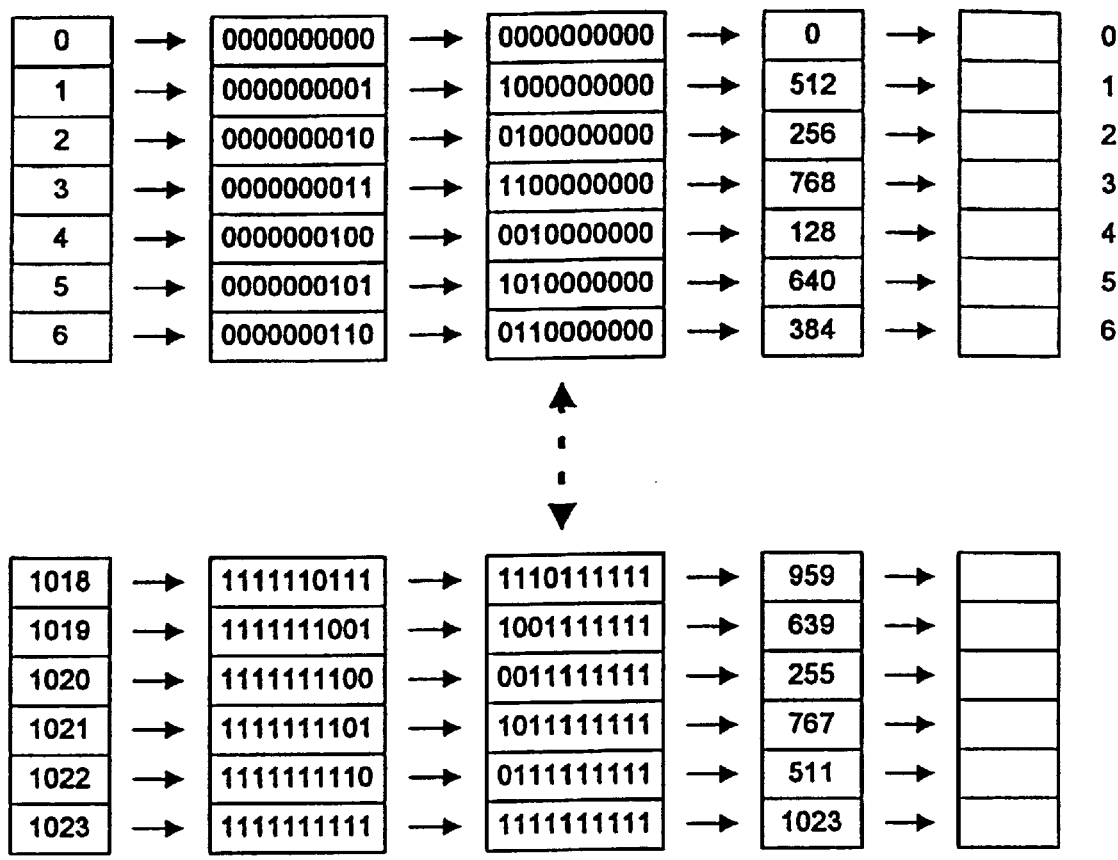
FIG. 10 shows an example of the slot determination function of the allocate slot function of FIG. 5.

Referring to FIG. 10, when b[i] equals 4096, then the binary count is a 12-bit binary number ranging from 000000000000 to 111111111111. Accordingly, a first stream which requires 8 slots would occupy slot numbers 0 (the bit reverse of 0 (mod 4096)), 2048 (the bit reverse of 1 (mod 4096)), 1024 (the bit reverse of 2 (mod 4096)), 3072 (the bit reverse of 3 (mod 4096)), 512 (the bit reverse of 4 (mod 4096)), 2560 (the bit reverse of 5 (mod 4096)), 1536 (the bit reverse of 6 (mod 4096)) and 3584(the bit reverse of 7 (mod 4096)). A second bit stream requiring four slots would occupy slot numbers 256 (the bit reverse of 8 (mod 4096)), 2304 (the bit reverse of 9 (mod 4096)), 1280 (the bit reverse of 10 (mod 4096)) and 2238 (the bit reverse of 11 (mod 4096)).

Accordingly, when allocating slots in accordance with the invention, the maximum distance between two filled slots is never more than twice the minimum distance between any two filled slots. This condition is true both with respect to individual streams as well as with respect to the combination of streams.

OTHER EMBODIMENTS

Other embodiments are within the following claims

For example, in the operation of scheduler 110, the system may be modified to take into account an accuracy parameter where the scheduler does not sleep if the time that the scheduler would sleep is less than a certain accuracy number. Such an adjustment may increase the efficiency of the operation of the system. Additionally, the computation of the next filled slot(s) value may be precomputed when slots are initially allocated to the streams, e.g., during the initialization step 300. Such an adjustment makes the computation efficient while transmitter 100 is operating. Additionally, while the scheduler of the preferred embodiment cycles through all slots in one second, accuracy is gained by providing a large number of slots and a larger cycle time. For example, rather than 4096 slots in one second, the scheduler may cycle through 65536 slots in 16 seconds.

What is claimed is:

1. A method for transmitting a plurality of input streams as a single output stream having an output stream bandwidth, the output stream having a predetermined number of slots per period, each slot having a slot capacity, the slot capacity being related to the output stream bandwidth divided by the predetermined number of slots per period, each input stream having a corresponding input stream speed, the method comprising determining a number of packets required to transmit an input stream of the plurality of input streams based upon the output stream bandwidth and the input stream speed of the input stream;

repeating the determining step for each of the plurality of input streams;

evenly spacing the packets of each of the plurality of input streams in the single output stream based upon the number of packets required to transmit all of the plurality of input streams; and allocating a subset of the total number of slots per period to each of the plurality of input streams to provide an input stream slot requirement such that the input stream slot requirement is related to the input stream speed divided by the slot capacity of each slot; the allocating further including sorting the input streams in decreasing order based upon the input stream slot requirement of each input stream, the sorting identifying an input stream having a largest input stream slot requirement and an input stream having a next largest input stream slot requirement;

allocating slots for the input stream having the largest input stream slot requirement first; and, allocating slots for the input stream having the next largest input stream slot requirement after slots are allocated for the input stream having the largest input stream slot requirement.

2. The method of claim 1 wherein each packet has a corresponding packet number and each packet corresponds to a slot in the single output stream;

each slot has a corresponding slot location in the output stream; and the slot locations are determined based upon a slot number.

3. The method of claim 2 wherein the slot locations are related to a bit reverse of a binary value of the slot number.

4. The method of claim 2 wherein the evenly spacing of the packets step includes the step of spacing the packets such that a maximum distance between two successive filled slots is never more than substantially twice a minimum distance between any two successive filled slots.

5. The method of claim 2 wherein the slot number is related to the number of packets required to transmit the plurality of input streams.

6. A system for transmitting a plurality of input streams as a single output stream having an output stream bandwidth, the output stream having a predetermined number of slots per period, each slot having a slot capacity, the slot capacity being related to the output stream bandwidth divided by the predetermined number of slots per period, each input stream having a corresponding input stream speed, the system comprising:

means for determining a number of packets required to transmit an input stream of the plurality of input streams based upon the output stream bandwidth and the input stream speed of the input stream;

means for repeating the determining step for each of the plurality of input streams;

means for evenly spacing the packets of each of the plurality of input streams in the single output stream based upon the number of packets required to transmit all of the plurality of input streams;

means for allocating a subset of the total number of slots per period to each of the plurality of input streams to provide an input stream slot requirement such that the input stream slot requirement is related to the input stream speed divided by the slot capacity of each slot;

means for sorting the input streams in decreasing order based upon the input stream slot requirement of each input stream, the sorting identifying an input stream having a largest input stream slot requirement and an input stream having a next largest input stream slot requirement;

means for allocating slots for the input stream having the largest input stream slot requirement first; and means for allocating slots for the input stream having the next largest input stream slot requirement after slots are allocated for the input stream having the largest input stream slot requirement.

7. The system of claim 6 wherein each packet has a corresponding packet number and each packet corresponds to a slot in the single output stream;

each slot has a corresponding slot location in the output stream; and the slot locations are determined based upon a slot number.

8. The system of claim 7 wherein the slot locations are related to a bit reverse of a binary value of the slot number.

9. The system of claim 7 wherein the means for evenly spacing of the packets includes means for spacing the packets such that a maximum distance between two successive filled slots is never more than substantially twice a minimum distance between any two successive filled slots.

10. The system of claim 7 wherein the slot number is related to the number of packets required to transmit the plurality of input streams.

* * * * *